Dec. 6, 1932.  L. L. GRAHAM ET AL  1,890,219
METHOD FOR TESTING AUTOMOBILE BRAKES
Original Filed Aug. 18, 1923  3 Sheets-Sheet 1

INVENTORS
Leon L. Graham
Oscar S. Flood
BY
M. W. McConkey
ATTORNEY

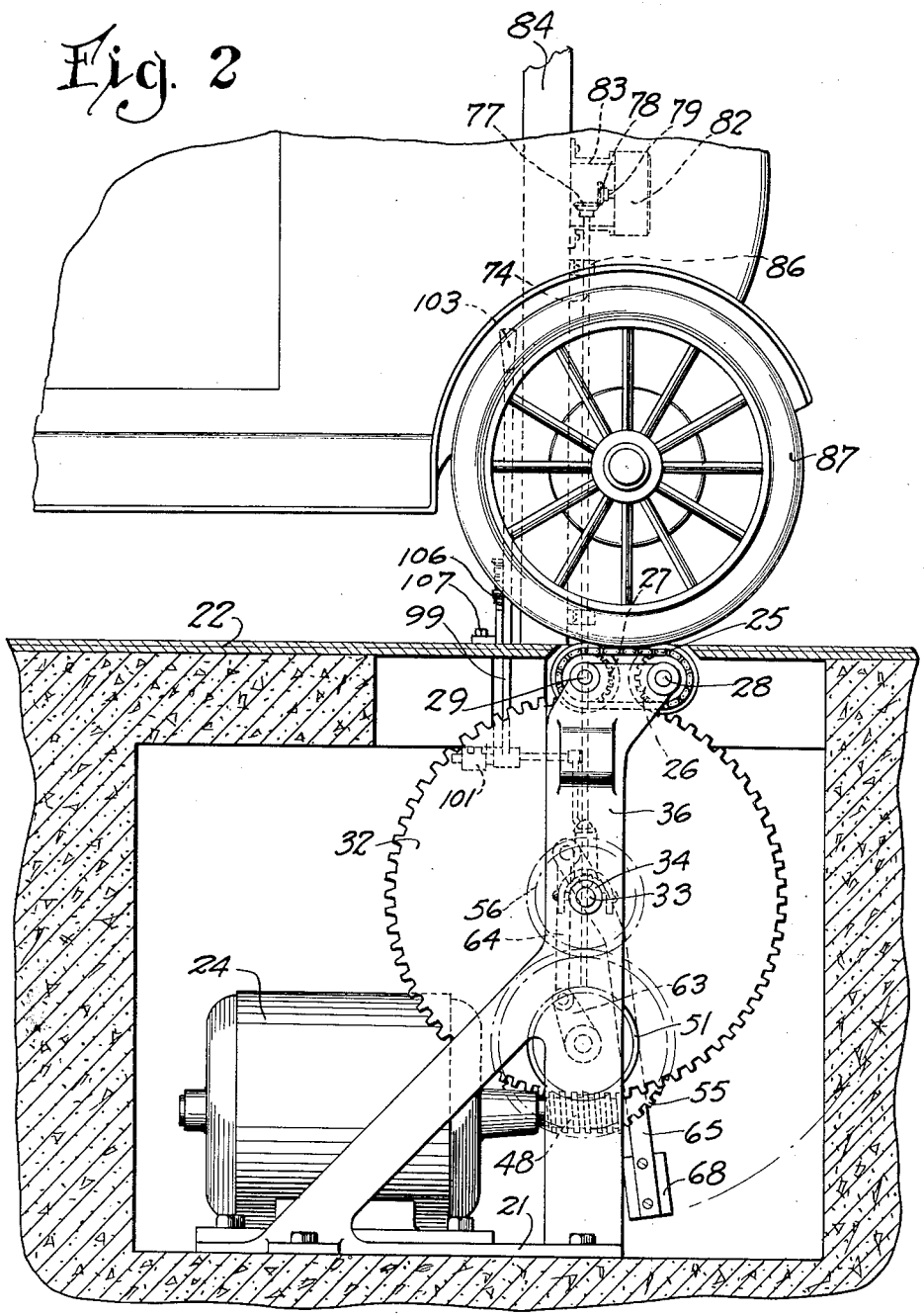

Dec. 6, 1932.  L. L. GRAHAM ET AL  1,890,219
METHOD FOR TESTING AUTOMOBILE BRAKES
Original Filed Aug. 18, 1923  3 Sheets-Sheet 3

INVENTORS
Leon L. Graham
Oscar S. Flood
BY
M. W. McConkey
ATTORNEY

Patented Dec. 6, 1932

1,890,219

UNITED STATES PATENT OFFICE

LEON L. GRAHAM AND OSCAR S. FLOOD, OF CHICAGO, ILLINOIS, ASSIGNORS TO BENDIX-COWDREY BRAKE TESTER, INC., OF SOUTH BEND, INDIANA, A CORPORATION OF DELAWARE

METHOD FOR TESTING AUTOMOBILE BRAKES

Original application filed August 18, 1923, Serial No. 658,001, Patent No. 1,789,650. Divided and this application filed November 21, 1930, Serial No. 497,301. Renewed September 22, 1932.

Our invention relates to a method for testing brakes, being particularly adapted for testing the brakes of automobiles.

The present application is a division of our application Serial No. 658,001, filed August 18, 1923, Patent No. 1,789,650.

A principal object of the invention is the provision of a method for measuring brake resistance at a factory, garage, or service station, and without the necessity of the road tests now commonly employed for this purpose.

A further object of the invention is the provision of a method in which the brake resistance of one or more wheels may be tested as desired and through the manipulation of simple and easily operable controls.

Numerous other objects and advantages of the invention will be apparent as it is better understood from the following description which, taken in connection with the accompanying drawings, discloses a preferred embodiment thereof.

Referring to the drawings,

Figure 2 is a side elevation thereof;

Figure 1:
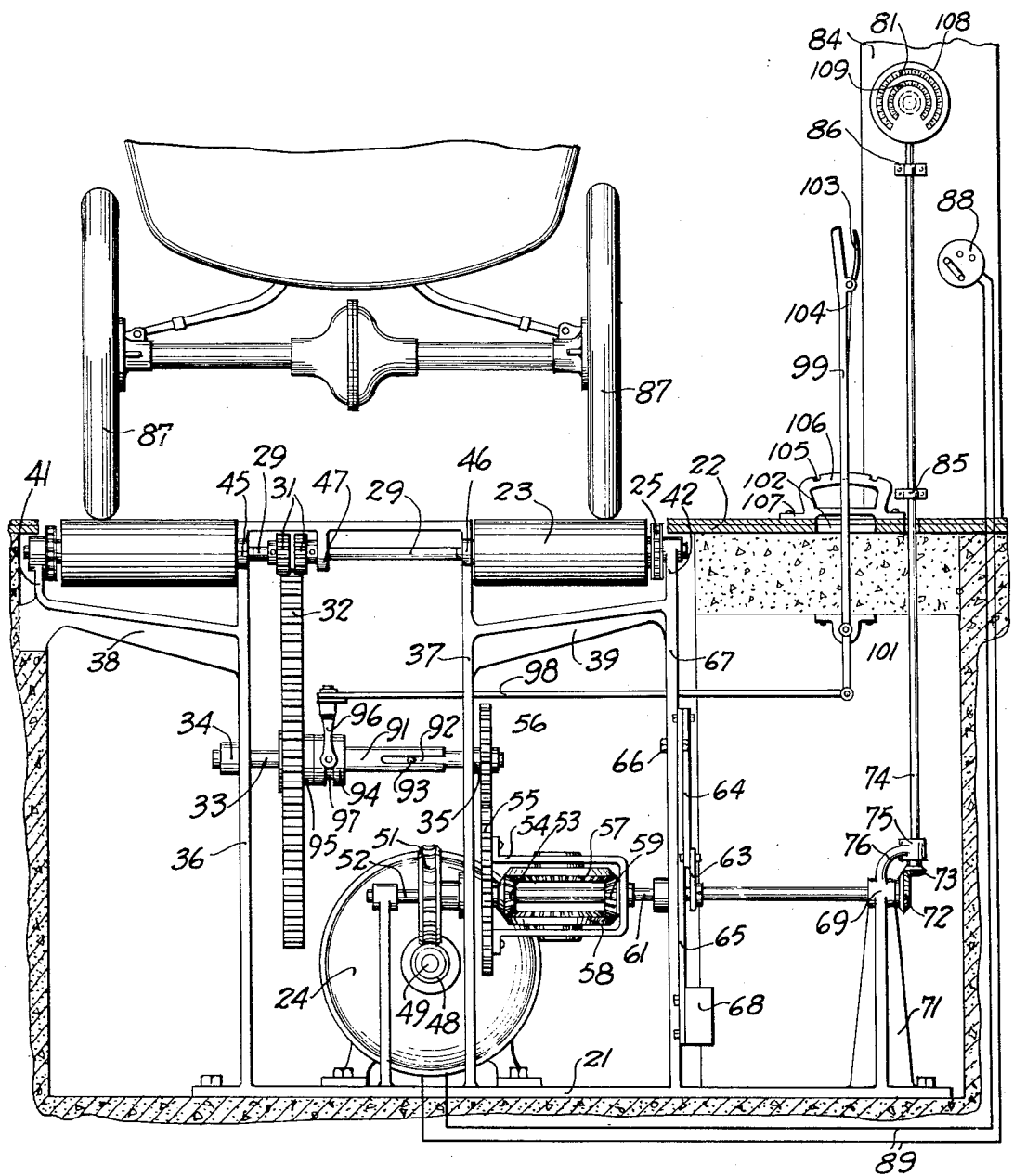
Figure 1 is a rear elevational view of the apparatus, the same being shown installed and with an automobile in position for testing.

While the embodiment of the invention shown in the drawings is believed to be suitable for ordinary conditions, it is, of course, obvious that the practical employment of the invention may necessitate considerable variance in arrangement and method of installation, in accordance with conditions at the particular factory or station in which it is used. For the purpose of illustration, we have shown in the drawings a sub-structure 21 arranged beneath the floor 22 and supporting the operating mechanism which will be hereinafter described.

Wheel rotating drums 23 are arranged in pairs at substantially the level of the floor 22 and are adapted to be rotated by means of a motor 24 operatively connected therewith, as shown particularly in Figure 1. The drums of each pair are connected together by means of a chain 25 taking over sprockets 26 and 27 mounted respectively on the drum shafts 28 and 29, the latter being driven by means of gearing to be now described. It is to be noted that a separate driving shaft 29 is provided for each pair of drums and these shafts may be driven separately or in unison, to test each wheel separately, or both together, as desired. Pinions 31 are provided one upon each shaft 29 and in adjacent position so that they may be driven either together or separately by means of a relatively wide ring gear 32, which is slidably mounted upon a shaft 33 having bearings 34 and 35 in uprights 36 and 37 of the framework 21. Said uprights are provided with laterally extending brackets 38 and 39, having upward extensions 41 and 42 which provide bearings 43 and 44 for the shafts 28 and 29. The opposite ends of said shafts are rotatably supported in the uprights 36 and 37, as indicated at 45 and 46, and a depending bearing 47 is provided between said uprights to support the end of the shaft 29, shown at the right in Figure 1, it being noted that this shaft is considerably longer than the corresponding shaft at the opposite side.

The gear 32 is driven from the motor 24 by means of a worm 48 on the motor shaft 49, said worm meshing with a worm gear 51 on a short transverse shaft 52, carrying, at its opposite end, a bevel pinion 53 which is the driver of a differential mechanism housed in a gear box 54 upon one end of which is formed a spur gear 55, meshing with a gear 56 upon the shaft 33.

Figure 4:
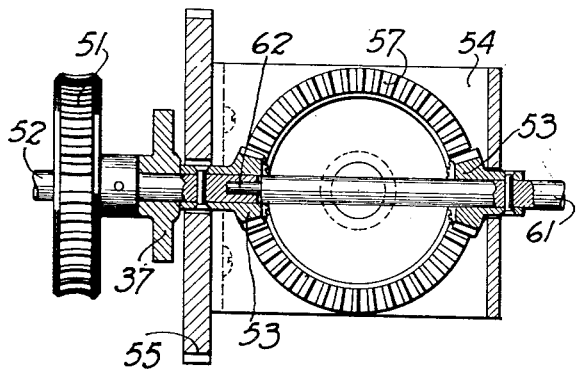
Figure 4 is a sectional view upon a somewhat larger scale, showing the differential gearing and gear housing employed in the operation of the apparatus.
Figure 3:
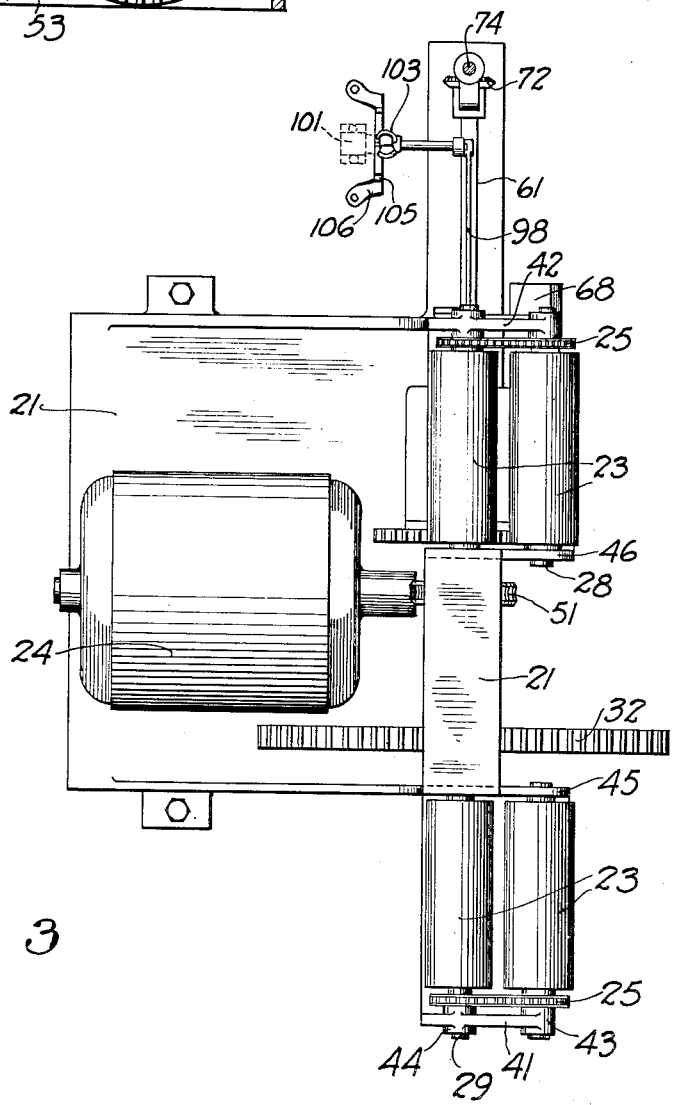
Figure 3 is a plan view.

The differential mechanism referred to comprises idle bevel gears 57 and 58, which are driven by the pinion 53, a second pinion 59 being mounted at the opposite side of said gear box upon a shaft 61 and meshing with said gears 57 and 58. It will be understood that the pinions 53 and 59 form the opposite sides of the differential, the shaft 61 being, of course, separate from the shaft 52, as will be readily apparent upon inspection of Figure 4. Said shaft 61 is provided at its inner end with a pin 62 riding freely within the end of the shaft 52, thus strengthening the structure and, at the same time, providing the usual divided relationship of the parts of the differential shaft.

Upon the shaft 61, we provide an arm 63 which is connected by a link 64 with the end of the weight lever 65, which latter is pivoted at 66 to an upright 67 of the frame 21, and carries at its free end a weight 68 which serves to normally hold said shaft 61 in fixed position. The outer end of the shaft 61 is rotatably supported at 69 in an upright 71 of the frame 21 and carries, beyond said bearing, a bevel gear 72 which meshes with a smaller bevel gear 73 upon a vertical shaft 74 having a bearing 75 in an arm 76 projected upwardly from the upright 71. Said shaft 74 extends upwardly through the floor 22 and carries, at its upper end, a bevel gear 77 meshing with a gear 78 upon a short shaft 79, which serves to drive indicating mechanism, shown generally at 81, in an indicator housing 82. Said housing 82 is secured by means of brackets 83 to a post, or upright, 84 extending upwardly from the floor 22. It will be observed also that the shaft 74 has bearings 85 and 86 upon the upright 84, which latter is positioned slightly to one side of the wheel rotating drums 23 and in convenient position for the reading of the indicating dial 81.

The method of operation of the indicator, it is believed, will be apparent from the foregoing description. The shaft 61 is ordinarily fixed by means of the weight 68, and rotation of the gears 57 and 58 will, therefore, cause rotation of the gear housing 54 by reason of the fact that there is less resistance to this movement than to rotation of the pinion 59, which would result if the shaft 61 were free. Rotation of the housing 54 drives the shaft 33 through the medium of the gears 55 and 56 and this, in turn, operates the shafts 29 through the medium of the gear 32 and the pinions 31. So long as there is no resistance upon the drums 23, they are thus driven freely and there is no effect whatever upon the shaft 61.

For the purpose of testing the brakes of an automobile, the latter may be driven into position with the wheels 87 upon the drums 23 and the motor turned on by means of a switch 88 positioned upon the upright 84 and connected by wiring 89 with said motor. So long as said wheels are free to rotate, the drums are not retarded and there is still no effect upon the shaft 61. Upon application of the brakes, however, it will be obvious that rotation of the drums 23 is resisted, there being such frictional engagement between the latter and the wheels as to cause them to rotate in unison, The resistance thus created tends to retard the rotation of the housing 54 and the pinion 59 is thus rotated proportionately to said resistance. In other words, in accordance with the principle of a differential mechanism, there is a tendency to equalize the resistance at opposite sides and to the extent that the drums 23 provide resistance overcoming that of the weight 68, the shaft 61 is rotated and in turn operates the dial indicator 81.

In order to test the brakes separately, we provide means for shifting the gear 32 upon the shaft 33, in order that it may mesh with either or both of the pinions 31. A sleeve 91 is positioned on the shaft 33 and is slotted, as indicated at 92, a pin 93 being provided upon the shaft 33 to take into said slot 92. A collar 94 is secured to the sleeve 91 and to a hub 95 of the gear 32. A bifurcated arm 96 has its opposite ends disposed in a slot 97 upon said collar 94 and is connected by means of a rod 98 with a lever 99 pivotally secured to a frame bracket 101 and extending upwardly through a slot 102 in the floor. A spring grip 103 is provided upon said lever 99 and operates a latching rod 104 adapted to engage at its lower end in recesses 105 in a latching bracket 106 secured to the floor by means of bolts 107, or in any preferred manner. The indicator 81 is provided with separate dials 108 and 109, one being adapted to indicate the resistance when both wheels are being rotated and the other being on a smaller scale and adapted to register the resistance when one wheel only is under test.

From the foregoing, it will be apparent that the only mechanism above ground is the bracket 84, upon which the indicator 81 and the switch 88 are mounted, and the shifting lever 99.

The apparatus provides an extremely practicable means of testing the brake resistance, not only of automobiles, but of other rotating members and is believed to provide a much needed improvement in the field to which the invention relates.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

Having thus described the various features of the invention, what we claim as new and desire to secure by Letters Patent is:

1. A method of testing a brake associated with a wheel of a vehicle comprising securing the vehicle against movement, rotating the wheel by force applied to the periphery thereof, applying the brake to the wheel, and measuring the resistance to the rotation of the wheel.

2. A method of testing brakes associated with the wheels of a motor vehicle comprising securing the vehicle against movement, supporting the wheel for rotation rotating the wheels by force applied to the periphery thereof, applying the brakes while the wheels are rotating, and measuring the resistance to rotation of the wheels.

3. A method of testing the brakes of vehicles comprising separately rotating a plurality of the wheels thereof, braking said wheels as desired and selectively connecting a single indicating mechanism to the desired wheel to ascertain the brake resistance.

4. A method of testing a set of brakes for the wheels of an automobile or the like which comprises continuously driving each wheel against the resistance of its brake by power acting through one or more complete revolutions of the wheel independently of the driving of any other wheel, so that the brake resistance acting at one wheel shall not interfere with power acting on any other wheel, and separately measuring the torque so developed in each wheel in driving such wheel against the resistance of its brake.

5. A method of testing the brakes of automobiles comprising applying power to one wheel at a time to continuously rotate that wheel through at least one complete revolution, then applying the brake to that wheel and measuring the resistance to the turning of that wheel.

6. A method of testing brakes of automobiles comprising applying power to one wheel at a time from a source external of the automobile to continuously rotate that wheel through a number of revolutions, then applying the brake to that wheel while continuing the rotation through at least a complete revolution, and measuring the resistance to the turning of the wheel.

7. A method of testing the brakes of automobiles comprising, connecting a source of power to one wheel at a time, applying the brake to that wheel, continuously rotating the wheel through at least a complete revolution by the source of power against the resistance of the brake, and measuring the resistance offered by the brake to the turning of the wheel by relative displacement in the connections between the source of power and the wheel.

8. The method of testing a set of brakes for the wheels of a motor vehicle comprising securing the vehicle against movement, applying a force separately to the periphery of each wheel to continuously rotate each wheel against the resistance of its associated brake acting through one or more complete revolutions of the wheel independently of the driving of any other wheel, so that the brake resistance acting on one wheel shall not interfere with the force acting on any other wheel, and separately noting the resistance offered by each brake to the turning of the respective wheel.

9. The method of testing the brakes of a motor vehicle comprising securing the vehicle against movement, applying power to the periphery of each wheel separately, applying the associated brake to each respective wheel, continuously rotating each wheel through at least a complete revolution against the resistance of the associated brake, and observing the resistance offered by each brake to the turning of the respective wheel.

10. The method of testing the brakes of the wheels of a motor vehicle comprising securing the vehicle against movement, separately and independently applying power to the periphery of each wheel to rotate the latter, applying the associated brake to each wheel, continuously rotating each wheel through at least a complete revolution against the resistance of the associated brake and measuring the resistance offered by each brake to the turning of the respective wheel.

In testimony whereof, we have hereunto signed our names.

LEON L. GRAHAM.
OSCAR S. FLOOD.